United States Patent
Otani

(10) Patent No.: US 7,430,644 B2
(45) Date of Patent: Sep. 30, 2008

(54) STORAGE DEVICE, CONTROL METHOD FOR PARTITIONING LOGICAL MEMORY DEVICES, AND MEDIUM EMBODYING PROGRAM FOR PARTITIONING LOGICAL MEMORY DEVICES

(75) Inventor: Hiroyuki Otani, Tokyo (JP)

(73) Assignee: NEC Corporation, Tokyo (JP)

( * ) Notice: Subject to any disclaimer, the term of this patent is extended or adjusted under 35 U.S.C. 154(b) by 299 days.

(21) Appl. No.: 11/122,101

(22) Filed: May 5, 2005

(65) Prior Publication Data

US 2005/0278489 A1 Dec. 15, 2005

(30) Foreign Application Priority Data

Jun. 15, 2004 (JP) .............................. 2004-176990

(51) Int. Cl.
G06F 12/00 (2006.01)
(52) U.S. Cl. ...................... 711/153; 711/114; 711/173
(58) Field of Classification Search ....................... None
See application file for complete search history.

(56) References Cited

U.S. PATENT DOCUMENTS

| 4,584,639 | A | * | 4/1986 | Hardy .............................. 726/2 |
| 4,607,346 | A | * | 8/1986 | Hill .............................. 711/170 |
| 5,455,934 | A | * | 10/1995 | Holland et al. .................. 711/4 |
| 2002/0165930 | A1 | * | 11/2002 | Theriault et al. ............ 709/214 |
| 2005/0010722 | A1 | * | 1/2005 | Chen .......................... 711/114 |

FOREIGN PATENT DOCUMENTS

| JP | 2001-350707 | 12/2001 |
| JP | 2004-13547 | 1/2004 |

OTHER PUBLICATIONS

IBM. HPSS SSM Guide High Performance Storage System Release 5.1. Feb. 2004 [retrieved on Apr. 19, 2007]. Retrieved from the internet <URL: http://www.hpss-collaboration.org/hpss/administrators/docs/AdobePDF/5.1/ssmguide.pdf>.*
Japanese Office Action dated Apr. 9, 2008 (with partial English translation).

* cited by examiner

Primary Examiner—Reginald G. Bragdon
Assistant Examiner—Larry T Mackall
(74) Attorney, Agent, or Firm—McGinn IP Law Group, PLLC

(57) ABSTRACT

A storage device which limits the partition of the logical memory devices for computers in accordance with properties such as reliability. An access control approves an access only to the logical memory device which was partitioned referring to an access control table. An access control setting control renews the access control table so as to partition the assigned logical memory devices to the assigned computer when the assigned logical memory devices can be partitioned. A utilization condition setting control determines the partition propriety of the logical memory device based the content of the partition condition defining table including a pair of the property condition which is the origin of judging whether the logical memory device can be partitioned or not and the partition propriety information of showing the propriety of partition to the computer and the content of the property table including a pair of the logical memory device ID and the property information of the corresponding logical memory device, and renews the partition management table.

3 Claims, 8 Drawing Sheets

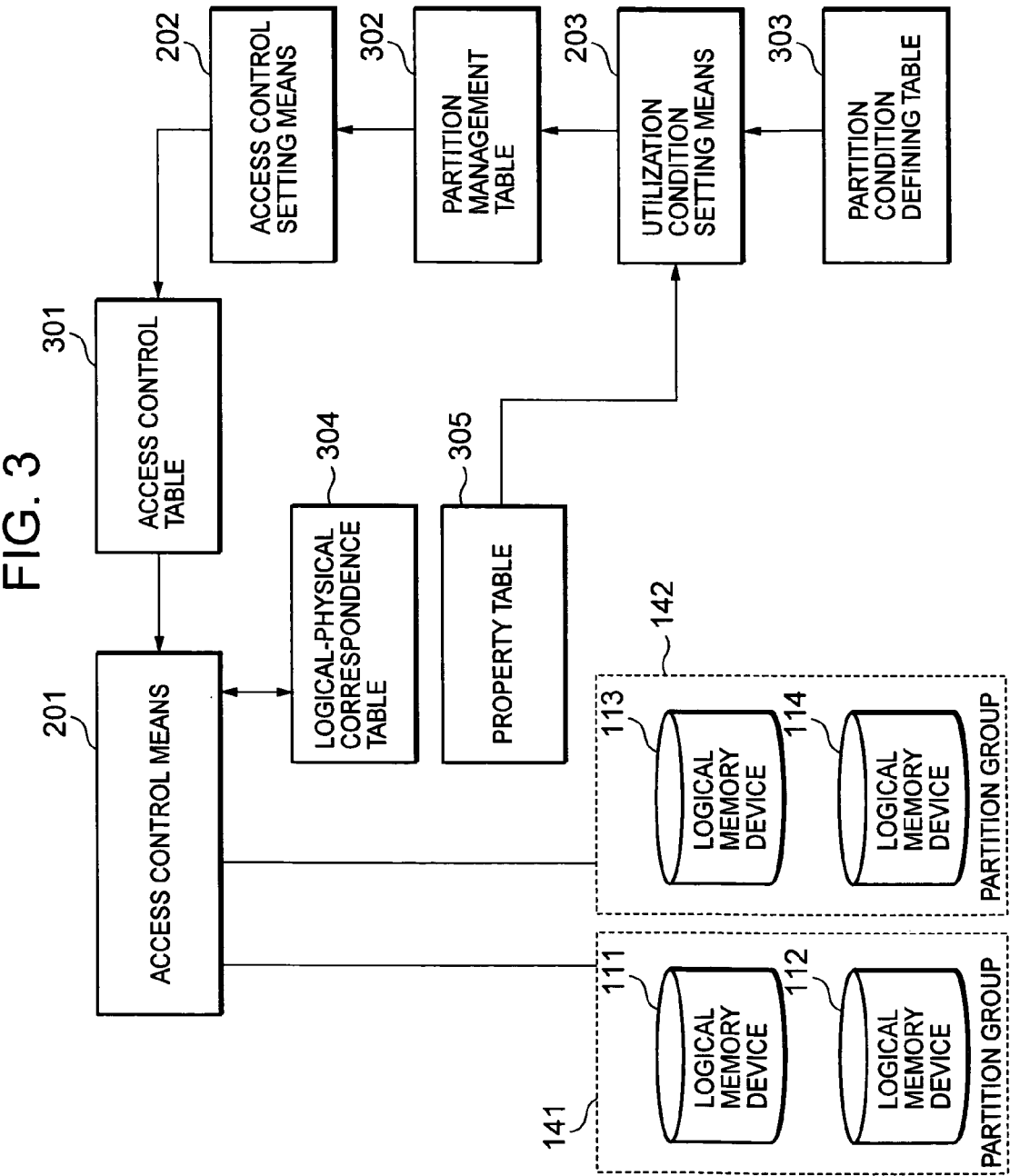

FIG. 4

ACCESS CONTROL TABLE 301

| LOGICAL MEMORY DEVICE ID | COMPUTER ID |
|---|---|
| A01 | HOST1 |
| A02 | HOST1 |
| B01 | HOST2 |
| B02 | HOST2 |

FIG. 5

PARTITION MANAGEMENT TABLE 302

| LOGICAL MEMORY DEVICE ID | PARTITION PROPRIETY INFORMATION |
|---|---|
| A01 | POSSIBLE |
| A02 | POSSIBLE |
| B01 | POSSIBLE |
| B02 | POSSIBLE |
| C01 | IMPOSSIBLE |

FIG. 6

PARTITION CONDITION DEFINING TABLE 303

| PROPERTY CONDITION | | PARTITION PROPRIETY |
|---|---|---|
| RELIABILITY | DUPLICATION SETTING | |
| HIGH | NO SETTING | POSSIBLE |
| HIGH | SETTING | POSSIBLE |
| LOW | NO SETTING | IMPOSSIBLE |
| LOW | SETTING | POSSIBLE |

PROPERTY TABLE 305

| LOGICAL MEMORY DEVICE ID | PROPERTY | |
|---|---|---|
| | RELIABILITY | DUPLICATION SETTING |
| A01 | HIGH | NO SETTING |
| A02 | HIGH | SETTING |
| B01 | LOW | NO SETTING |
| B02 | LOW | SETTING |

STORAGE DEVICE, CONTROL METHOD FOR PARTITIONING LOGICAL MEMORY DEVICES, AND MEDIUM EMBODYING PROGRAM FOR PARTITIONING LOGICAL MEMORY DEVICES

BACKGROUND OF THE INVENTION

1. Field of the Invention

The present invention relates to a storage device, a control method for partitioning logical memory devices and a medium embodying program for partitioning logical memory devices, and specifically, relates to a storage device which controls the propriety of partition to a computer, a control method for partitioning logical memory devices and a medium embodying program for partitioning logical memory devices.

2. Description of the Related Art

There has conventionally existed a storage device which includes a plural number of logical memory devices by agglomeration of a plural number of physical memory devices, as disk array devices which are represented by RAID (Redundant Arrays of Inexpensive/Independent Disks). In general, a plural number of computers are connected with the storage device, and a plural number of computers utilize the logical memory devices which were composed in the storage device.

When the storage device including a plural number of logical memory devices by a plural number of physical memory devices partitions the logical memory device to computers which were connected with the storage device, it has freely partitioned them without relating to properties such as performance and reliability. Consequently, it has been unable to limit the partitioning of the logical memory devices based on the condition of partition which the properties such as performance and reliability and the storage device definition.

There occur problems of the destruction of data in accordance with an erroneous operation and security in a condition in which all logical memory devices composed in the storage device are accessible from computers.

For example, there is disclosed a technique of partitioning the storage zones of a storage device from the upper hierarchy (computer and the like) of the storage device in accordance with the properties such as performance and reliability of storage and the kinds and uses of data, in JP-A-2004-13547.

SUMMARY OF THE INVENTION

An exemplary feature of the present invention is to provide a storage device which limits the partition of the logical memory devices for computers in accordance with the condition of partition which was defined to the properties such as performance and reliability and the storage device so that the logical memory devices are unable to be utilized for uses other than objectives, a control method for partitioning the logical memory devices of the storage device and a control program for partitioning the logical memory devices of the storage device.

In a first exemplary aspect, storage device which includes a plural number of logical memory devices by agglomeration of a plural number of physical memory devices and is accessed by a plural number of computers, said storage device comprising:

a partition management table which is composed of a pair of a logical memory device ID discriminating the logical memory devices and the partition propriety information indicating the propriety of partition to the computer;

an access control table including a pair of the logical memory device ID and a computer ID discriminating the computer to which the logical memory devices discriminated by the logical memory device ID are partitioned and accessible;

an access control setting means for carrying out partition, judging the propriety of partition of the logical memory devices required, by referring to the partition management table, and renewing the access control table when the partition is approved; and an access control means for approving the access from the computer which required the access to the logical memory devices, based on the computer ID and the logical memory device ID partitioned, by referring to the access control table.

In another exemplary aspect of the present invention, control method for partitioning the logical memory devices of a storage device which includes a plural number of logical memory devices by agglomeration of a plural number of physical memory devices and is accessed by a plural number of computers, said method comprising:

referring to a partition management table which includes a pair of a logical memory device ID discriminating the logical memory devices and the partition propriety information indicating the propriety of partition to the computer when the partition of the logical memory devices to the computer is required, judging the propriety of partition of the logical memory devices required, renewing a access control table when the access is approved and carrying out the partition; and referring to the access control table including a pair of the logical memory device ID and a computer ID discriminating the computer to which the logical memory devices discriminated by the logical memory device ID are partitioned and accessible and approving the access from the computer which required the access to the logical memory devices based on the computer ID and the logical memory device ID partitioned.

In yet another exemplary aspect of the present invention, signal-bearing medium tangibly embodying a program of machine-readable instructions executable by a digital processing apparatus for partitioning logical memory devices for causing a storage device which includes a plural number of logical memory devices by agglomeration of a plural number of physical memory devices and is accessed by a plural number of computers to perform a method of partitioning logical memory devices, said method, comprising:

determining a partition propriety of the logical memory device and renewing a partition management table based on the content of a partition condition defining table including a pair of a property condition, which is the used for judging whether the logical memory device can be partitioned or not, and a partition propriety information showing the propriety of partition to the computer and a content of a property table including a pair of a logical memory device ID and a property information of the corresponding logical memory device.

In yet another exemplary aspect of the present invention, storage device, comprising:

a controller to partition a plurality of physical memory devices into a plurality of logical memory devices accessible by at least one computer, wherein said partition operation is dependent upon at least one classification of at least one property of each said physical memory device.

The present invention can improve performance and reliability by partitioning in accordance with tables that define properties of each storage unit.

BRIEF DESCRIPTION OF THE DRAWINGS

The above and other exemplary aspects, features and advantages of the present invention will become apparent from the following detailed description when taken with the accompanying drawings in which:

FIG. 3 is a block chart showing the composition of a control portion.

FIG. 4 is an illustration drawing showing one example of the access control table.

FIG. 5 is an illustration drawing showing one example of the partition management table.

FIG. 6 is an illustration drawing showing one example of the partition condition defining table.

DETAILED DESCRIPTION OF THE EXEMPLARY EMBODIMENTS

Figure 1:
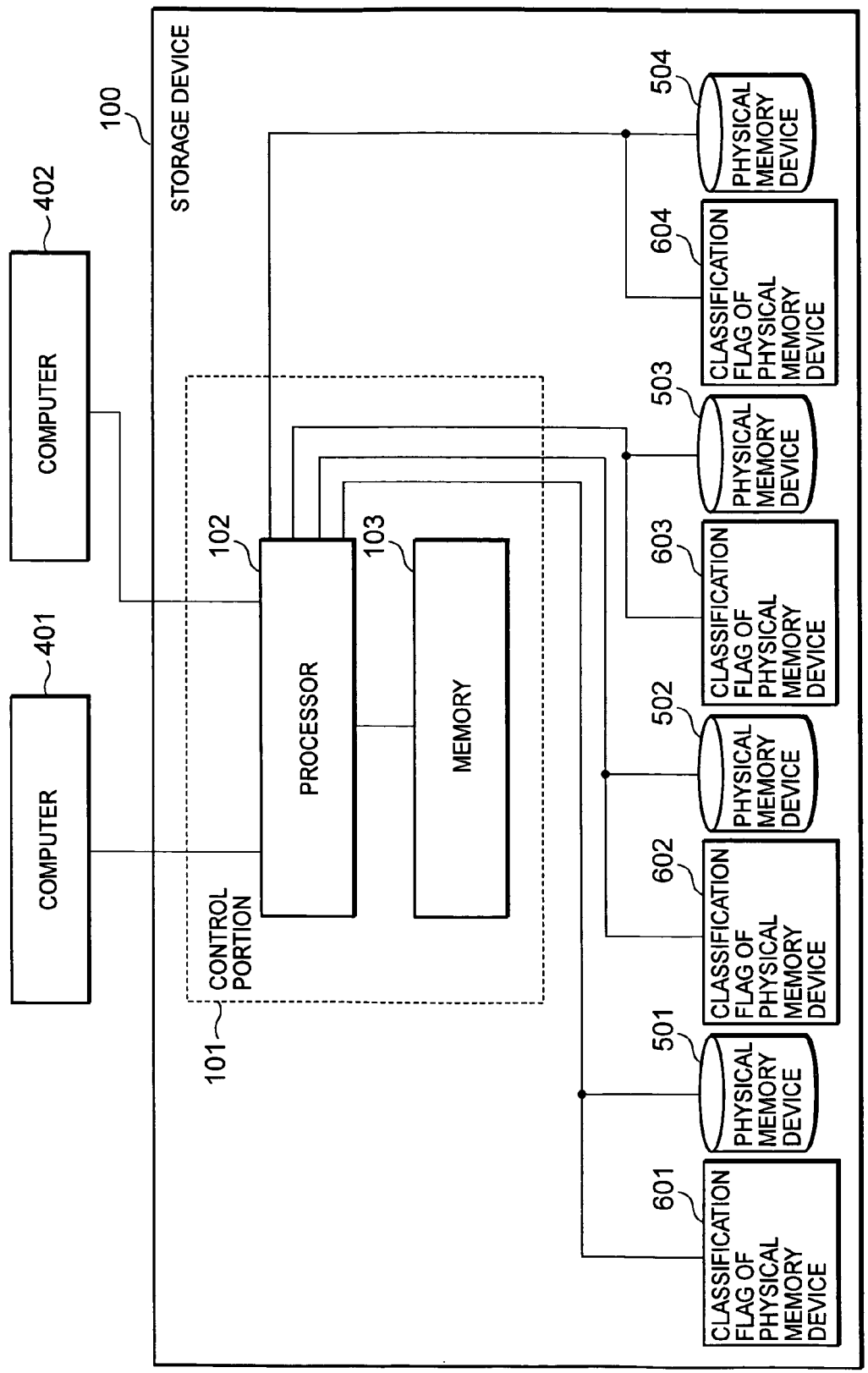
FIG. 1 is a block chart showing the composition of the storage device of the present invention.

Then, exemplary embodiments of the present invention are specifically illustrated referring to the drawings.

Referring to FIG. 1, embodiment of the present invention includes a computer 401 and a computer 402 and a storage device 100 which is connected with the computer 401 and computer 402.

The storage device 100 includes a control portion 101, a physical memory device 501, a physical memory device 502, a physical memory device 503 and a physical memory device 504 which are a hard disk or the like, a classification flag 601 of the physical memory device 501, a classification flag 602 of the physical memory device 502, a classification flag 603 of the physical memory device 503 and a classification flag 604 of the physical memory device 504. The physical memory device 501 and the physical memory device 502 are devices having high reliability, and the physical memory device 503 and the physical memory device 504 are devices having low reliability. The control portion 101 includes a processor 102 and a memory 103 which stores a program performed by the processor 102 and data.

Figure 2:
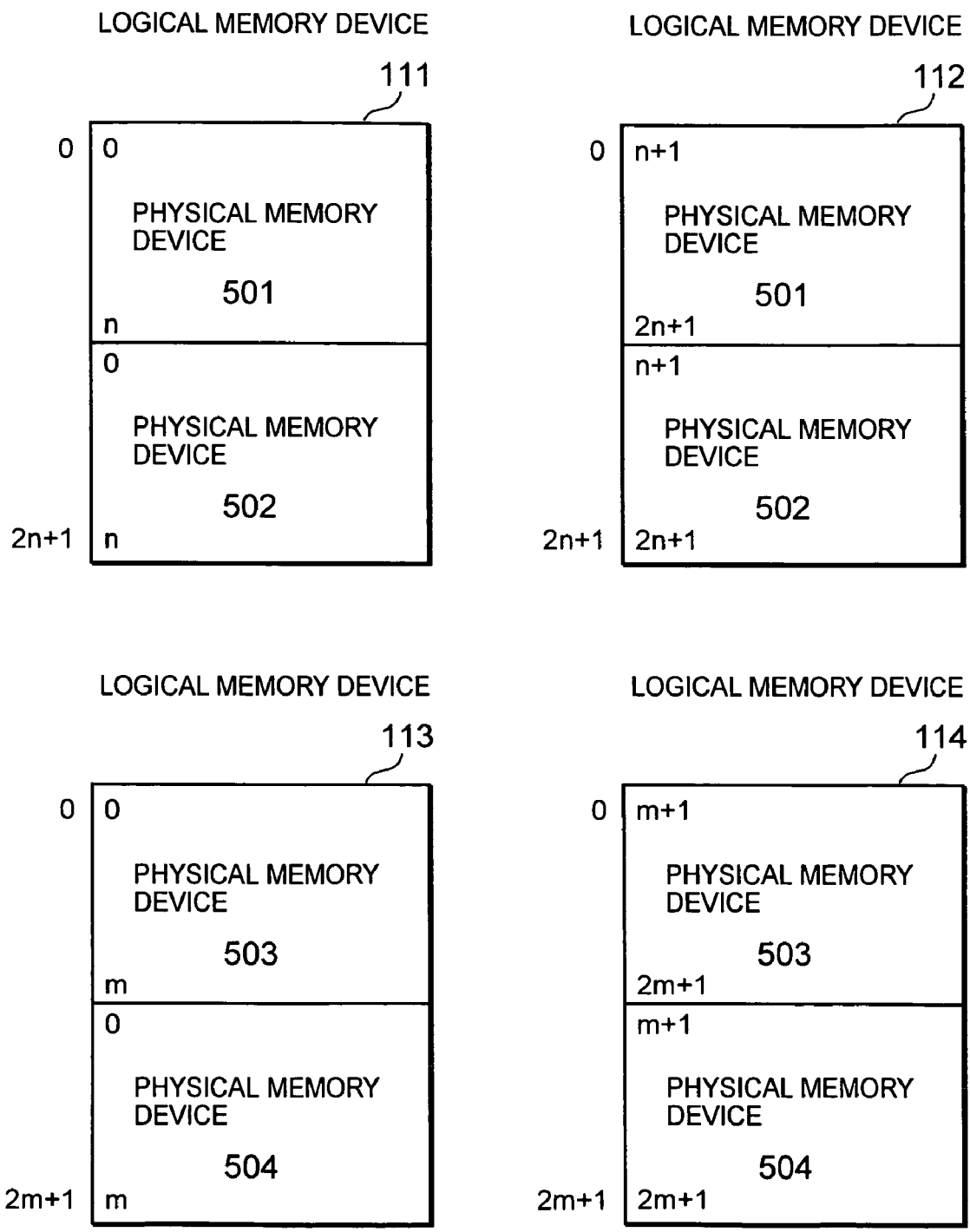
FIG. 2 is an illustration drawing showing one example of the correspondence of a logical memory device with a physical memory device.

Then, in FIG. 2; the correspondence of the logical memory devices with the physical memory devices is explained.

One logical memory device does not include both of the zone of the device having high reliability and the zone of the device having low reliability.

Referring to FIG. 2, a logical memory device 111 includes No.0 to No.n zones of the physical memory device 501 and No.0 to No.2n+1 zones which are linked with No.0 to No.n zones of the physical memory device 502. A logical memory device 112 includes No.n+1 to No.2n+1 zones of the physical memory device 501 and No.0 to No.2n+1 zones which are linked with No.n+1 to No.2n+1 zones of the physical memory device 502. A logical memory device 113 includes No.0 to No.m zones of the physical memory device 503 and No.0 to No.2 m+1 zones which are linked with No.0 to No.m zones of the physical memory device 504. A logical memory device 114 includes No.m+1 to No.2 m+1 zones of the physical memory device 503 and No.0 to No.2 m+1 zones which are linked with No.m+1 to No.2 m+1 zones of the physical memory device 504. The computer 401 and the computer 402 access to the logical memory devices. The logical memory device 111 and the logical memory device 112 are partitioned to the computer 401. The logical memory device 111 and the logical memory device 112 are called as a partition group 141. The logical memory device 113 and the logical memory device 114 are partitioned to the computer 402. The logical memory device 113 and the logical memory device 114 are called as a partition group 142.

Referring back to FIG. 1, the classification flag 601 of the physical memory device 501 through the classification flag 604 of the physical memory device 504 which are composed of ROM and the like are explained. The classification flag 601 of the physical memory device shows the level of reliability of the physical memory device 501. The classification flag 602 of the physical memory device shows the level of reliability of the physical memory device 502. The classification flag 603 of the physical memory device shows the level of reliability of the physical memory device 503. The classification flag 604 of the physical memory device shows the level of reliability of the physical memory device 504.

Then, the compositions of the control portion 101 realized by the processor 102 and the memory 103, shown in FIG. 1, is now explained.

Referring to FIG. 3, the control portion 101 includes an access control means 201, an access control setting means 202, a utilization condition setting means 203, an access control table 301, a partition management table 302, a partition condition defining table 303, a logical-physical correspondence table 304 and a property table 305. The access control means 201, the access control setting means 202 and the utilization condition setting means 203 are realized by a control program and stored in the memory 103. The processor 102 reads out the control program from the memory 103, carries it out and realizes a function. The access control table 301, the partition management table 302, the partition condition defining table 303 and the logical-physical correspondence table 304 are stored in the memory 103 as data and accessed by the processor 102.

The access control means 201 is activated by access requirement from the computer 401 and computer 402 and approves the access only to the physical memory device which was partitioned to the computer 401 and computer 402 referring to the access control table 301. The access control setting means 202 refers to the partition management table 302 and renews the access control table 301 when the assigned logical memory device can be partitioned, so that said physical memory device is partitioned to the computer 401 and computer 402.

The utilization condition setting means 203 refers to the partition condition defining table 303 and the property table 305, and changes the propriety of the partition of the logical memory device 111 to the logical memory device 114 to renew the partition management table 302. Further, the access control means 201 accesses to the physical memory device corresponding to the logical memory device referring to the logical-physical correspondence table 304.

Referring to FIG. 4, the access control table 301 is includes a pair of a logical memory device ID, being information discriminating the logical memory devices and the computer ID, being an information discriminating the computer which becomes accessible by partition of the logical memory device. The logical memory devices ID of the logical memory device 111, the logical memory device 112, the logical memory device 113 and the logical memory device 114 are respectively A01, A02, B01 and B02. Further, the computers ID of the computer 401 and the computer 402 are respectively Host1 and Host2.

Referring to FIG. 5, the partition management table 302 includes a pair of a logical memory device ID and partition propriety information showing whether the partition to computers is possible or not. The logical memory device 111 (logical memory device ID=A01), the logical memory device 112 (logical memory device ID=A02), the logical memory device 113 (logical memory device ID=B01) and the logical memory device 114 (logical memory device ID=B02) can be partitioned.

Referring to FIG. 6, the partition condition defining table 303 includes a pair of the property condition, which is the origin of judging whether the logical memory devices in the storage device 100 can be partitioned or not, and the partition property information showing whether it can be partitioned to the computer or not. The property condition is, for example, the reliability of the logical memory device which is introduced from the reliabilities of the physical memory device 501 to the physical memory device 504 and the duplication setting of the logical memory device in the storage device 100. Not only the property condition shown in FIG. 6, but also various property conditions such as performance are possible. The duplication setting is, for example, a setting whether the logic device is set for duplication so as to be able to be duplicated for backup or not.

In FIG. 6, the logical memory device having low reliability to which the duplication setting is not carried out cannot be partitioned. For example, the memory device having low reliability is limitedly used for backup of the duplication.

The partition condition defining table 303 is set with a key board and the like which are connected to the storage device 100 by a manager of the storage device 100.

The logical-physical correspondence table 304 includes correspondence information showing the correspondence of the logical memory device 111 to the logical memory device 114 with the physical memory device 501 to the physical memory device 504. The correspondence information is equivalent to the content shown in FIG. 2. The logical-physical correspondence table 304 is set from a keyboard and the like, which are connected with the storage device 100 by the manager of the storage device 100, by referring to the property table 305 and the classification flag 601 of the physical memory device to the classification flag 604 of the physical memory device. It is set in one of the logical memory devices so that the logical memory devices having different reliability do not exist in mixture and the different duplication settings do not exist in mixture.

Figures 7, 8:
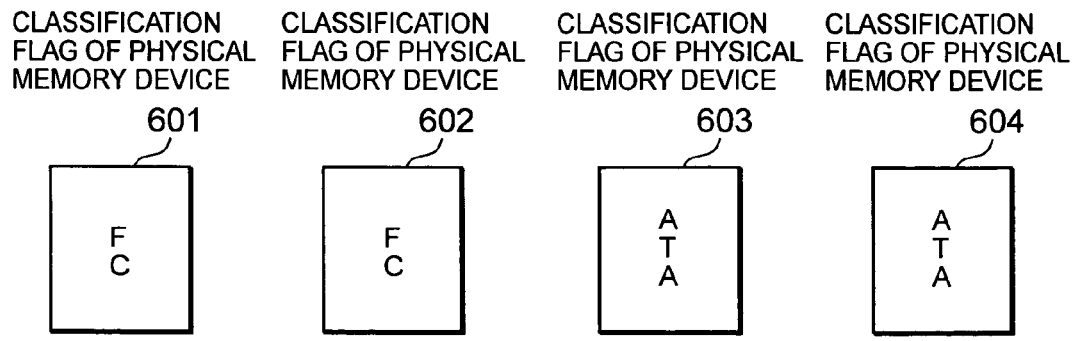
FIG. 7 is an illustration drawing showing one example of the classification flag of the physical memory device.
FIG. 8 is an illustration drawing showing one example of the property table.

Referring to FIG. 7, the classification flag 601 of the physical memory device to the classification flag 604 of the physical memory device include classification information showing the classification flag 601 to the classification flag 604 of the physical memory device. The classification flag 601 of the physical memory device and the classification flag 602 of the physical memory device are "FC", and show that the physical memory device 501 and physical memory device 502 are devices having high reliability. The classification flag 603 of the physical memory device and the classification flag 603, of the physical memory device are "ATA", and show that the physical memory device 503 and physical memory device 504 are devices having low reliability.

The classification flag 601 to the classification flag 604 of the physical memory device can be displayed on a display which is connected to the storage device 100. The manager of the storage device 100 can display the classification flag 601 to the classification flag 604 of the physical memory device on a display which is connected to the storage device 100.

Referring to FIG. 8, the property table 305 includes the physical memory device ID's and corresponding properties (reliability and duplication setting). The logical memory device 111 (logical memory device ID=A01) has high reliability and its duplication setting is not set. The logical memory device 112 (logical memory device ID=A02) has high reliability and its duplication setting is set. The logical memory device 113 (logical memory device ID=B01) has low reliability and its duplication setting is not set. The logical memory device 114 (logical memory device ID=B02) has low reliability and its duplication setting is set. The property table 305 is set with a key board and the like which are connected to the storage device 100 by a manager of the storage device 100.

The operation of the components of the present invention is explained referring to the drawings.

Figure 9:
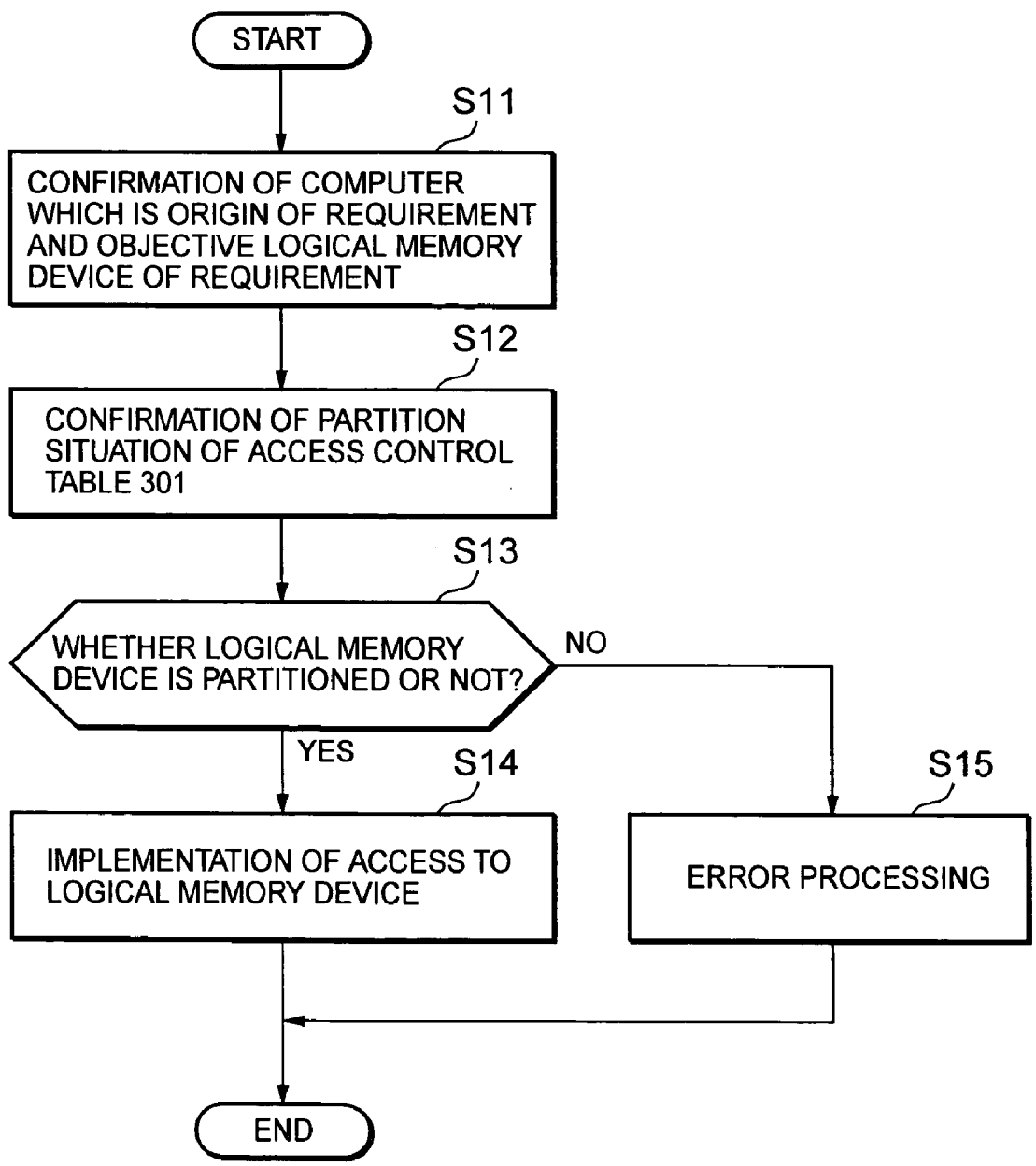
FIG. 9 is a flow chart showing the operation of the access control means.

Referring to FIG. 9, the access control means 201 is actuated by receiving an access requirement (the discrimination information of the logical memory device is included) for the storage device 100 from the computer 401 or the computer 402.

Firstly, the access control means 201 confirms the discrimination information of the computer 401 which issued the access requirement or the discrimination information of the computer 402 and the discrimination information of the logical memory device which is the objective of the access requirement (FIG. 9, step S11). The access control means 201 confirms the partition information of the computer 401 which is the origin of the access requirement or the computer 402 referring to the access control table 301 (step S12).

Then, the access control means 201 judges whether the logical memory device which is the objective of the access requirement is partitioned to the computer which is the origin of the access requirement, or not (step S13). If the partition is there, then the access control means 201 carries out access for the logical memory device which is the objective of the access requirement in accordance with the access requirement (step S14). In fact, it accesses to the physical memory device corresponding to the logical memory device based on the logical-physical correspondence table 304.

If the partition is not there, then the access control means 201 carries out an error processing (step S15) There are, approved accesses from the computer 401 (computer ID=Host1) to the logical memory device 111 (logical memory device ID=A01) and the logical memory device 112 (logical memory device ID=A02). There are approved accesses from the computer 402 (computer ID=Host2) to the logical memory device 113 (logical memory device ID=B01) and the logical memory device 114 (logical memory device ID=B02). The access from the computer 401 to the logical memory device 113 gives rise to an error processing.

Figure 10:
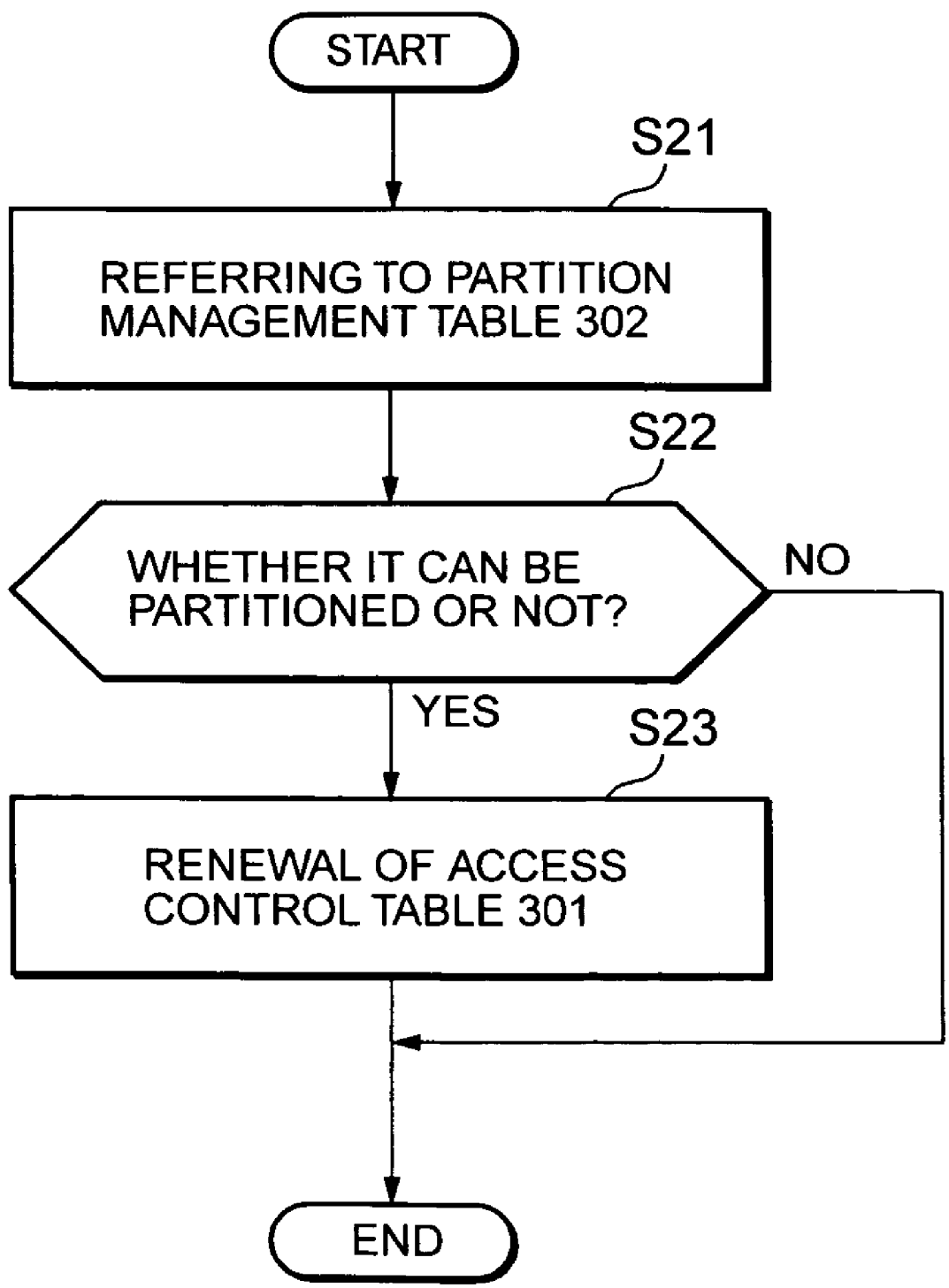
FIG. 10 is a flow chart showing the operation of the access control setting means.

The operation of the access control setting means 202 is explained in FIG. 10. The access control setting means 202 is actuated and operated by a manager of the storage device 100 when the partition of the logical memory device which was assigned to a computer assigned is changed.

Referring to FIG. 10, firstly, the access control setting means 202 refers to the partition management table 302 (FIG. 10, step S21).

Then, when the logical memory device assigned can be partitioned to the computer assigned (step S22/YES), the access control setting means 202 partitions the logical memory device assigned, to the computer assigned, records a pair of the logical memory device ID of the logical memory device assigned and the computer ID of the computer assigned, for the access control table 301, and renews the access control table 301 (step S23). When the logical memory device assigned cannot be partitioned to the computer assigned (step S22/NO), the access control setting means 202 does not renew the access control table 301.

Figure 11:
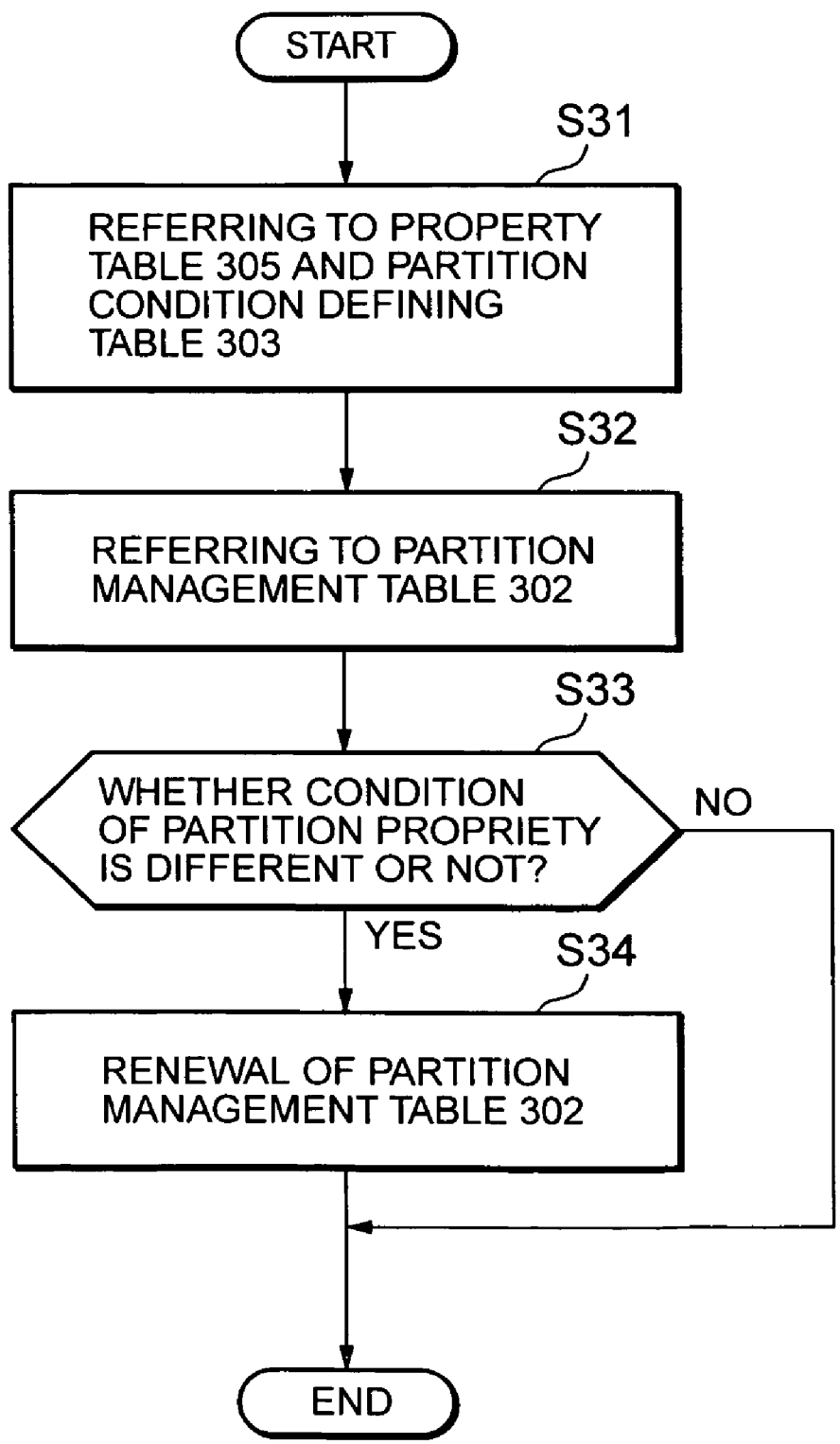
FIG. 11 is a flow chart showing the operation of the utilization condition setting means.

The operation of the utilization condition setting means 203 is explained in FIG. 11.

The utilization condition setting means 203 is actuated and operated by a manager of the storage device 100 when any phenomenon related to the condition of the logical memory device in the storage device 100 is generated. For example, there is a case that a new logical memory device was additionally constituted by additionally providing a physical memory device for the storage device 100, or a case that a logical memory device was defined as being used for duplicating in the device, etc.

Referring to FIG. 11, firstly, the utilization condition setting means 203 refers to the property table 305 and the partition condition defining table 303 (FIG. 11, step S31). Further, it refers to the partition management table 302 (step S32).

Then, the utilization condition setting means 203 confirms the property table 305 and the property condition of the logical memory device which was recorded in the partition condition defining table 303 with respect to the objective logical memory device in which the phenomenon was generated, and confirms the propriety of partition corresponding to the objective logical memory device. When the propriety condition of partition corresponding to the objective logical memory device is different from the propriety condition of partition in the partition condition defining table 303 in the utilization condition setting means 203 (step S33/YES), the utilization condition setting means 203 changes the propriety condition of partition in the partition management table 302 to the propriety condition of partition which is defined by the partition condition defining table 303, and renews the partition management table 302 (step S34).

For example, in the partition management table 302, a case that the partition propriety information corresponding to the logical memory device ID=A02 is impossible is explained. In the property table 305 of FIG. 8, the reliability of the property corresponding to the logical memory device ID=A02 is high and the duplication setting is set. Further, in the partition condition defining table 303, when the reliability of the property condition is high and the duplication setting is set, the partition can be carried out. Accordingly, the utilization condition setting means 203 renews the partition propriety information corresponding to the logical memory device ID=A02 of the partition management table 302 as possible.

The partition condition defining table 303 and the property of the property table 305 may be one of either of reliability and the duplication setting. Further, it may be other property.

Further, the access control means 201 can be made as a composition mixing hardware and software.

While the present invention has been described in connection with certain exemplary embodiments, it is to be understood that the subject matter encompassed by the present invention is not limited to those specific embodiments. On the contrary, it is intended to include all alternatives, modifications and equivalents as can be included within the spirit and scope of the following claims.

What is claimed is:

1. A storage device which includes a plural number of logical memory devices by agglomeration of a plural number of physical memory devices and is accessed by a plural number of computers, said storage device comprising:

a partition management table which comprises one or more pairs, each said pair comprising a logical memory device identification (ID) discriminating one of the logical memory devices and partition propriety information indicating a propriety of partition;

an access control table including a pair comprising the logical memory device ID and a computer ID discriminating a computer to which the logical memory device discriminated by the logical memory device ID is partitioned and accessible;

an access control setting means for:
 judging a propriety of partition of the logical memory devices as required, by referring to the partition management table; and
 renewing the access control table when the partition is approved; and an access control means for approving the access from a computer which required the access to the logical memory device, based on the computer ID and the logical memory device ID partitioned, by referring to the access control table;

a partition condition defining table including a pair of at least one property condition, which is used for judging whether the logical memory device can be partitioned or not, and a partition propriety information showing a propriety of partition to a computer; and a property table including a pair comprising a logical memory device ID and property information corresponding to the logical memory device; and a utilization condition setting means for determining the partition propriety of the logical memory device based on a content of the partition condition defining table and a content of the property table and renewing the partition management table, the property table including, as the property information, a reliability and a duplication setting for each logical memory device, the partition condition defining table including the reliability and duplication setting as the property condition and the partition propriety information which indicates that a partition is possible when the reliability is high, a partition is possible when the reliability is low and the duplication setting is set and a partition is impossible when the reliability is low and the duplication setting is not set, and the utilization condition setting means renewing the partition propriety information for each logical memory device of the partition management table in accordance with the property table and the partition condition defining table.

2. A control method for partitioning logical memory devices of a storage device which includes a plural number of logical memory devices by agglomeration of a plural number of physical memory devices and is accessed by a plural number of computers, said method comprising:

referring to a partition management table which includes one or more pairs, each said pair comprising a logical memory device ID discriminating one of the logical memory devices and partition propriety information indicating a propriety of partition to a computer when a partition of the logical memory devices to the computer is required, judging the propriety of partition of the logical memory devices required, renewing an access control table when an access is approved and carrying out the partition;

referring to the access control table, said access control table including one or more pairs, each pair comprising the logical memory device ID and a computer ID discriminating a computer to which the logical memory devices discriminated by the logical memory device ID are partitioned and accessible and approving the access from the computer which required the access to the logical memory devices, based on the computer ID and the logical memory device ID partitioned;

determining a partition propriety of the logical memory device and renewing the partition management table based on a content of the partition condition defining table including a pair of a condition which is the origin of judging whether the logical memory device can be partitioned or not and a partition propriety information of showing the propriety of partition to the computer and a content of a property table including one or more pairs, each said pair comprising a logical memory device ID and a property information corresponding to the logical memory device; and renewing the partition propriety information for each logical memory device of the partition management table in accordance with a content of the property table, said property table including, as the property information, a reliability and a duplication setting for each logical memory device and with a content of the partition condition defining table, said partition condition defining table including the partition propriety information which includes a reliability and a duplication setting as the property condition and shows that a partition is possible when the reliability is high, the partition is possible when the reliability is low and the duplication setting is set, and the partition is impossible when the reliability is low and the duplication setting is not set.

3. A signal-bearing medium tangibly embodying a program of machine-readable instructions executable by a digital processing apparatus for partitioning logical memory devices for causing a storage device which includes a plural number of logical memory devices by agglomeration of a plural number of physical memory devices and is accessed by a plural number of computers to perform a method of partitioning logical memory devices, said method, comprising:

determining a partition propriety of a logical memory device and renewing a partition management table based on;
 a content of a partition condition defining table including one or more pairs, each said pair comprising a property condition, used for judging whether or not the logical memory device can be partitioned, and a partition propriety information showing a propriety of partition to the computer; and
 a content of a property table including one or more pairs, each said pair comprising a logical memory device ID and property information corresponding to the logical memory device;

determining the partition propriety of the logical memory device and renewing the partition management table based on:
 a content of the partition condition defining table including a one or more pairs, each said pair comprising a property condition used for judging whether the logical memory device can be partitioned and a partition propriety information showing the propriety of partition to computer;
 a content of a property table including one or more pairs, each said pair comprising a logical memory device ID and a property information corresponding to the logical memory device;

renewing the partition propriety information for each logical memory device of the partition management table in accordance with;
 a content of the property table including a reliability and a duplication setting for each said logical memory device as the property information; and
 a content of the partition condition defining table including the partition propriety information which includes the reliability and the duplication setting as the property condition and shows that a partition is possible when the reliability is high, a partition is possible when the reliability is low and the duplication setting is set, and a partition is impossible when the reliability is low and the duplication setting is not set.

* * * * *